March 14, 1967  S. J. BLANK ETAL  3,309,705

RADAR TARGET FOR CIRCULARLY POLARIZED RADIATION

Filed June 8, 1966

INVENTORS
STEPHEN J. BLANK
LOUIS H. SACKS
BY
ATTORNEY

United States Patent Office 3,309,705
Patented Mar. 14, 1967

3,309,705
RADAR TARGET FOR CIRCULARLY POLARIZED RADIATION
Stephen J. Blank, 54—44 Little Neck Parkway, Little Neck, N.Y. 11362, and Louis H. Sacks, 117—26 Springfield Blvd., Cambria Heights, N.Y. 11411
Filed June 8, 1966, Ser. No. 556,062
5 Claims. (Cl. 343—18)

This invention relates to microwave targets such as heretofore used in radar systems for boresight alignment, reduction of radom target scintillation, and increasing maximum effective detection range. More particularly, the invention is concerned with trihedral corner reflectors and with the adaptation of such reflectors to use with circularly polarized radiation, for the elimination of rain clutter, which reduces the ability of the radar system to locate through rain or snow.

The (trihedral) corner reflector has desirable optical properties and structural characteristics (Antenna Engineer-Handbook, H. Jasik, editor—chapter 13, "Passive Reflectors") but, like all reflectors, involving an odd number of reflections, the sense of polarization of the reflected radiation is reversed, so that it has the same sense of circular polarization as the reflections from rain or snow. As a result, the reflected signal from an unmodified reflector tends to be indistinguishable from that from rain or snow. It has been proposed to correct for this characteristic of the trihedral corner reflector by interposing in the path of the incident and reflected beam a grid which restores the original sense of polarization rotation to the reflected beam (Weil et al. Patent 2,786,198). Neither this nor other proposals have, however, proven generally applicable where the requirements as to precision, mechanical strength, collapsibility and/or erectibility, and economy are at all exacting.

It is the general object of the present invention to provide a corner reflector system which does not reverse the sense of polarization of the reflected beam, and to achieve this result in a structure of a mechanically rugged character, which is adapted to economical precision manufacture.

A target embodying the invention in a preferred form will now be described with reference to the accompanying drawing, and the features forming the invention will then be pointed out in the appended claims.

In these figures a fully triangular trihedral with rigid sides is shown. This is done for simplicity and is not meant to preclude the use of truncated versions of the trihedral nor the use of inflatable or foldable designs to obtain a more compactly storable model of the trihedral reflector.

Figure 1:
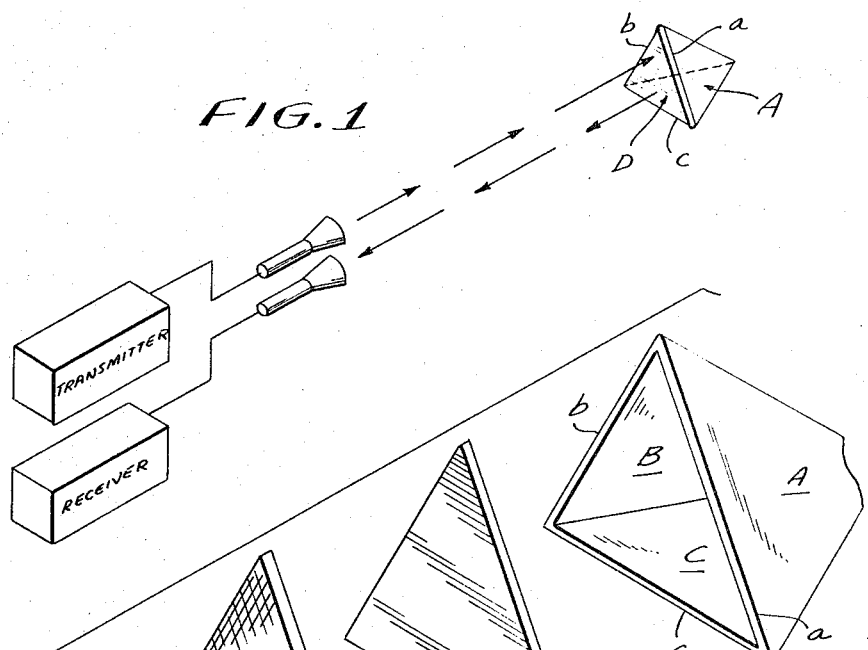
FIG. 1 is a schematic of a corner reflector embodying the invention in a preferred form as used in a radar system.
Figure 2:
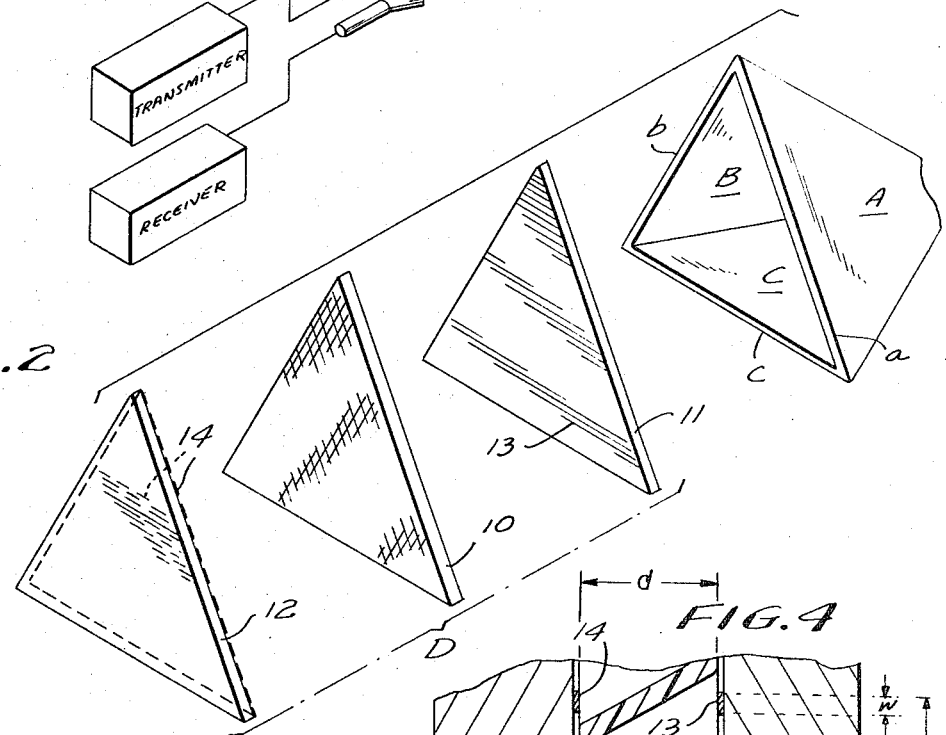
FIG. 2 is an exploded isometric view showing elements of the reflector of FIG. 1.
Figure 3:
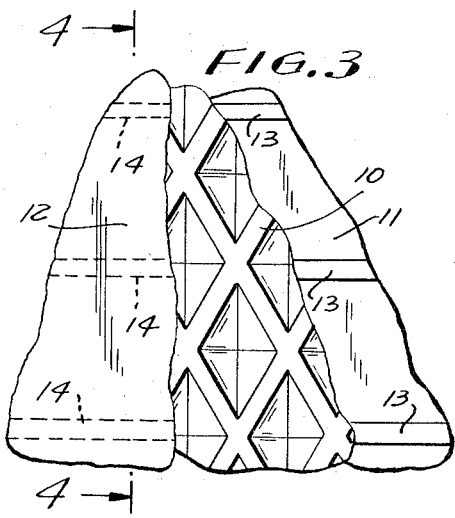
FIG. 3 is an enlarged fragmentary schematic view of a portion of the aperture face of the reflector of FIG. 1.
Figure 4:
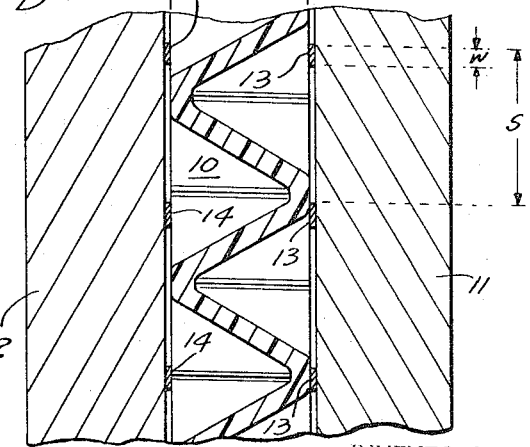
FIG. 4 is a section on the line 4—4 of FIG. 3.

The reflector proper comprises walls A, B and C, each wall having the form of a right-angled triangle and the sides $a$, $b$, $c$ (FIG. 1) being equal. These walls may be formed of Fiberglas honeycomb, plastic or other radomes material and are internally plated or surfaced with a smooth, mirror-like conducting material, such as aluminum or other suitable metal, so that the electromagnetic radiation is reflected. In accordance with the known properties of corner reflectors, an incident ray of radiation (providing its path is so spaced from the axis of the reflector and at such an angle to it that it strikes all three walls) will be reflected back along a parallel path. Since the number of reflections is odd, the reflections of a right-handed circularly polarized wave will be a left-hand circularly polarized wave, so that the otherwise very desirable trihedral corner reflector is not suited to the use of a circularly polarized beam, as is desirable under conditions of rain or other interference.

In order to correct for this characteristic of a corner reflector and to reflect a circularly polarized wave as one having the same sense of polarization, a grid structure indicated generally at D is provided. This structure is so designed as to retard one component vector of the circularly polarized wave in phase with respect to the perpendicular vector, by 90 degrees, as the wave passes through the grid structure. As the reflected wave again passes through the grid structure, a further retardation by 90 degrees takes place, so that one component vector will have been displaced by a total of 180 degrees with respect to the other. This is equivalent to a single reversal in the sense of polarization which when added to the odd number of reversals undergone by the wave on striking the three inner surfaces of the trihedral reflector, results in a reflected wave with the same sense of polarization rotation as the incident wave.

The target system of the present invention is adopted to use with microwaves of various wavelengths, but will be described herein with reference to radiation of 33,200 megacycles frequency or a wavelength of 0.356 inch, this being one commonly used radar frequency.

The grid D fits over the aperture of the reflector and is joined to the wall edges $a$, $b$, $c$, as by means of an epoxy adhesive. Screws or clips may also be used to hold the grid D in place.

The grid is conveniently formed of several layers. In the structure shown these comprise a central spacing and structural layer 10, of Fiberglas honey comb or other radome material to which the inner and outer elements 11 and 12 are joined as by means of epoxy adhesive. The inner and outer grid supporting elements 11 and 12 carry space conductor strips 13 and 14. The elements 11 and 12 are of radome material and the grids 13, 14 thereon are conveniently formed by plating with a conductor such as copper and then etching away the unwanted material. The outer element 12 is conveniently half wavelength thick, or very thin while the inner elements may be very thin, as for example, .005 inch thick. Materials such as Teflon, Fiberglas, polycarbonate, Reoxolite, etc., are suitable for the elements 11 and 12.

The construction provided and manufacturing methods available permit holding the dihedral angles to the theoretical 90 degrees, plus or minus one-quarter degree, while the grid dimensions are held within plus or minus two thousandths of an inch.

The width $w$ and spacing $s$ of the conductors are selected, in relation to the value of the dielectric constant and thickness $d$ of the material 10, so as to give a 90 degree retardation of the horizontal vector of the circularly polarized wave, by comparison with the vertical vector, in passing through the grid. A dimension of 0.117 inch for the spacing $s$ and 0.015 inch for the width $w$, and 0.122 inch for the honeycomb spacer thickness $d$ with average dielectric constant 1.2 are satisfactory. Spacing of the planar elements and dimensions and spacing of the conductor strips may be computed for different dielectric materials and different wave-lengths of radar radiation in accordance with known principles as set forth, for example, in M. Marcuvitz, Waveguide Handbook, (New York; McGraw-Hill Book Co., 1951), MIT Radiation Laboratory Series, X, 284.

As will be apparent, the construction of the present invention has a solidity and simplicity which is not obtainable utilizing prior art elements. At the same time equal or improved electro-magnetic efficiency is provided.

What is claimed is:

1. A corner reflector target for use with circularly polarized radar beams, comprising a trihedral reflector arrangement and a triangular phasing grid assembly covering the aperture thereof, the said phasing grid assembly comprising two grid support plates of radome material, two parallel spaced conductor grids supported by the said plates, the said grids being spaced apart by a dielectric spacer plate and the conductors of the said grids being spaced from each other by a fraction of a wavelength and having a width a fraction of the said spacing and such that a circularly polarized wave passing through the grid structure and being reflected back therethrough is polarized in its original sense.

2. A corner reflector according to claim 1 in which the grid conductors are supported upon sheets of radome material which are adhesively joined to the said spacer plate.

3. A corner reflector according to claim 2 in which the spacer plate is of a suitable dielectric, with a thickness $d$ depending on the value of the dielectric constant of the spacer material used, (with reference to radar radiation of 33,200 megacycles frequency, a thickness of 0.122 inch being satisfactory when the dielectric constant of the spacer plate material is 1.20), and the inner and outer grid supporting sheets are of radome material of either negligible thickness or an integral number of one-half wavelength thickness (reference to the wavelength in the dielectric media).

4. A corner reflector according to claim 3 in which the spacer plate is of honeycomb construction.

5. A corner reflector according to claim 3 in which the outer sheet is one-half wavelength thick for extra protection and sturdiness, and the inner sheet is negligibly thin for lightest weight.

References Cited by the Examiner
UNITED STATES PATENTS 2,786,186    3/1957    Weil et al. _____ 343—18

RODNEY D. BENNETT, *Acting Primary Examiner.*

D. C. KAUFMAN, *Assistant Examiner.*